United States Patent
Stackelhouse

(10) Patent No.: US 7,421,887 B2
(45) Date of Patent: Sep. 9, 2008

(54) MOISTURE DETECTION AND CONTROL USING SENSOR FEEDBACK

(75) Inventor: Scott D. Stackelhouse, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/264,082

(22) Filed: Nov. 1, 2005

(65) Prior Publication Data
US 2007/0095127 A1 May 3, 2007

(51) Int. Cl.
G01N 5/02 (2006.01)
(52) U.S. Cl. .............................................. 73/73; 73/74
(58) Field of Classification Search .................. 73/73, 73/74
See application file for complete search history.

(56) References Cited

U.S. PATENT DOCUMENTS

| | | | | |
|---|---|---|---|---|
| 4,571,543 | A * | 2/1986 | Raymond et al. | 324/425 |
| 4,740,735 | A | 4/1988 | Hayashi | 318/483 |
| 4,798,956 | A * | 1/1989 | Hochstein | 250/341.8 |
| 4,827,198 | A * | 5/1989 | Mueller et al. | 318/483 |
| 5,040,411 | A * | 8/1991 | Medzius | 73/73 |
| 5,157,312 | A | 10/1992 | Wallrafen | 318/264 |
| 5,185,558 | A * | 2/1993 | Benedict et al. | 315/80 |
| 5,200,676 | A * | 4/1993 | Mueller et al. | 318/444 |
| 5,210,500 | A * | 5/1993 | Pingel et al. | 324/667 |
| 5,213,259 | A * | 5/1993 | Stouffer | 236/44 C |
| 5,304,936 | A * | 4/1994 | Buschur | 324/689 |
| 5,436,541 | A * | 7/1995 | Mangler et al. | 318/483 |
| 5,659,294 | A | 8/1997 | Schroder | 340/602 |
| 5,739,430 | A | 4/1998 | Berberich | 73/335.05 |
| 5,780,719 | A | 7/1998 | VanDam | 73/29.01 |
| 5,861,758 | A | 1/1999 | Berberich | 324/694 |
| 6,218,741 | B1 | 4/2001 | Braun et al. | 307/10.1 |
| 6,690,130 | B2 | 2/2004 | Klug et al. | 318/444 |
| 6,802,205 | B2 | 10/2004 | Barguirdjian et al. | 73/73 |
| 2005/0156608 | A1 * | 7/2005 | Katz | 324/658 |
| 2006/0150437 | A1 * | 7/2006 | Tarnowski et al. | 34/443 |
| 2007/0163339 | A1 * | 7/2007 | Keep et al. | 73/170.19 |

FOREIGN PATENT DOCUMENTS

JP 10153540 A * 6/1998

* cited by examiner

Primary Examiner—Hezron E. Williams
Assistant Examiner—Tamiko D Bellamy

(57) ABSTRACT

A method for moisture detection and removal is provided. The method involves providing discrete feedback as an indication of current moisture accumulation on a surface of a perforated plane, wherein the plane includes at least one moisture sensor, integrated within the surface to form the plane, comparing the indication of current moisture accumulation with a threshold value, when the indication of current moisture accumulation exceeds the threshold value, sending an activation signal to a moisture removal mechanism, removing the current moisture accumulation from an area of the first surface bound by the at least one moisture sensor, and clearing the indication of current moisture accumulation to avoid any unnecessary operation of the moisture removal mechanism.

17 Claims, 3 Drawing Sheets

MOISTURE DETECTION AND CONTROL USING SENSOR FEEDBACK

TECHNICAL FIELD

Figure 1:
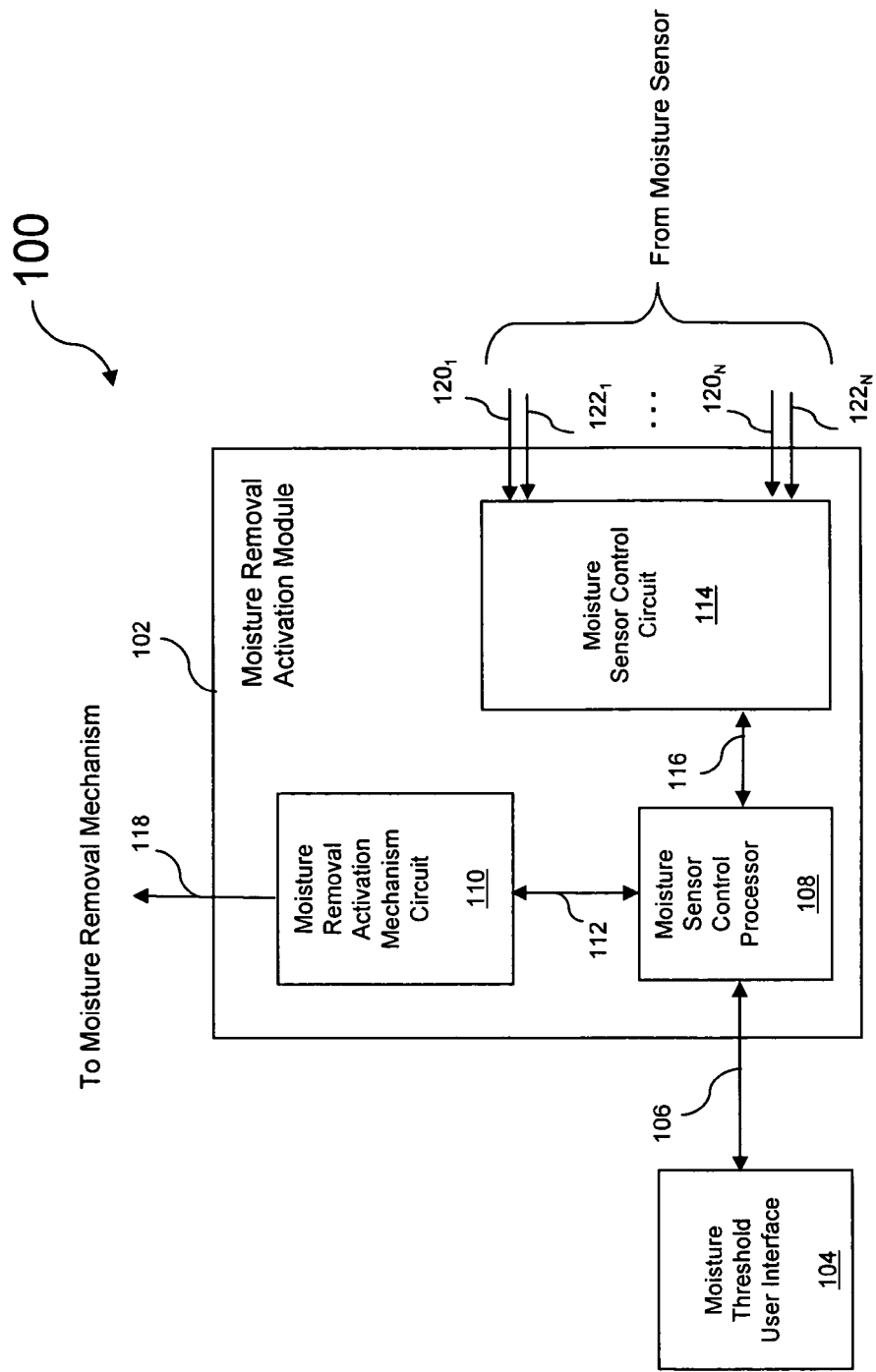

The present invention relates generally to moisture detection and removal, and in particular, using moisture sensor feedback in a control circuit for automatic moisture removal.

BACKGROUND

Continuing innovations in monitoring systems rely upon advancements in electronic sensing technology to detect various conditions. These conditions include, but are not limited to, a loss of pressure, changing lighting conditions, and surface moisture detection, to name a few. In the area of surface moisture detection, assorted methods have been employed to activate one or more moisture removal mechanisms. These methods systematically adjust their mode(s) of operation based on the amount of moisture present on a surface.

To provide adequate responsiveness in moisture monitoring systems, regulation of a system's operation becomes a necessary requirement. Any regulation that is added must not add complexity to the operation of the system. When additional features are added to an existing system consistent performance of the system must be maintained. If the additional features are making the system unreliable, the safety and protection that the system was intended to provide becomes an actual hazard.

Current approaches to activating a response mechanism in the monitoring systems mentioned above often have long response times with respect to changing conditions. Many times an operator is forced to manually operate the system depending on the magnitude of the changing conditions. Further, some monitoring systems are either overly sensitive or not responsive enough when the response mechanism is to be engaged.

For the reasons stated above and for other reasons stated below which will become apparent to those skilled in the art upon reading and understanding the specification, there is a need in the art for an improved method of moisture detection and removal.

SUMMARY

The above mentioned problems with moisture detection and removal and other problems are addressed by embodiments of the present invention and will be understood by reading and studying the following specification.

In one embodiment, a method for moisture detection and removal is provided. The method involves providing discrete feedback as an indication of current moisture accumulation on a surface of a perforated plane, wherein the plane includes at least one moisture sensor, integrated within the surface to form the plane, comparing the indication of current moisture accumulation with a threshold value, when the indication of current moisture accumulation exceeds the threshold value, sending an activation signal to a moisture removal mechanism, removing the current moisture accumulation from an area of the first surface bound by the at least one moisture sensor, and clearing the indication of current moisture accumulation to avoid any unnecessary operation of the moisture removal mechanism.

In one embodiment, a moisture sensor is provided. The sensor includes a plane having a first surface and at least one series of sensor conductor pairs coupled to the first surface providing discrete feedback to a control circuit when moisture is detected on the first surface, wherein each of the at least one series of sensor conductor pairs form a closed circuit when moisture is detected by at least one sensor conductor pair.

In one embodiment, a system for moisture detection and removal is provided. The system includes a moisture threshold user interface and a moisture removal activation module. The moisture removal activation module includes a moisture sensor control circuit connected to at least one moisture sensor integrated with a first surface to form a perforated plane, a moisture removal activation mechanism circuit, and a moisture sensor control processor coupled to the moisture sensor control circuit and the moisture removal activation mechanism circuit, wherein the moisture sensor control processor responds to a clearing of accumulated moisture from an area of the first surface bound by the at least one moisture sensor by a moisture removal mechanism.

DRAWINGS

Figure 2:
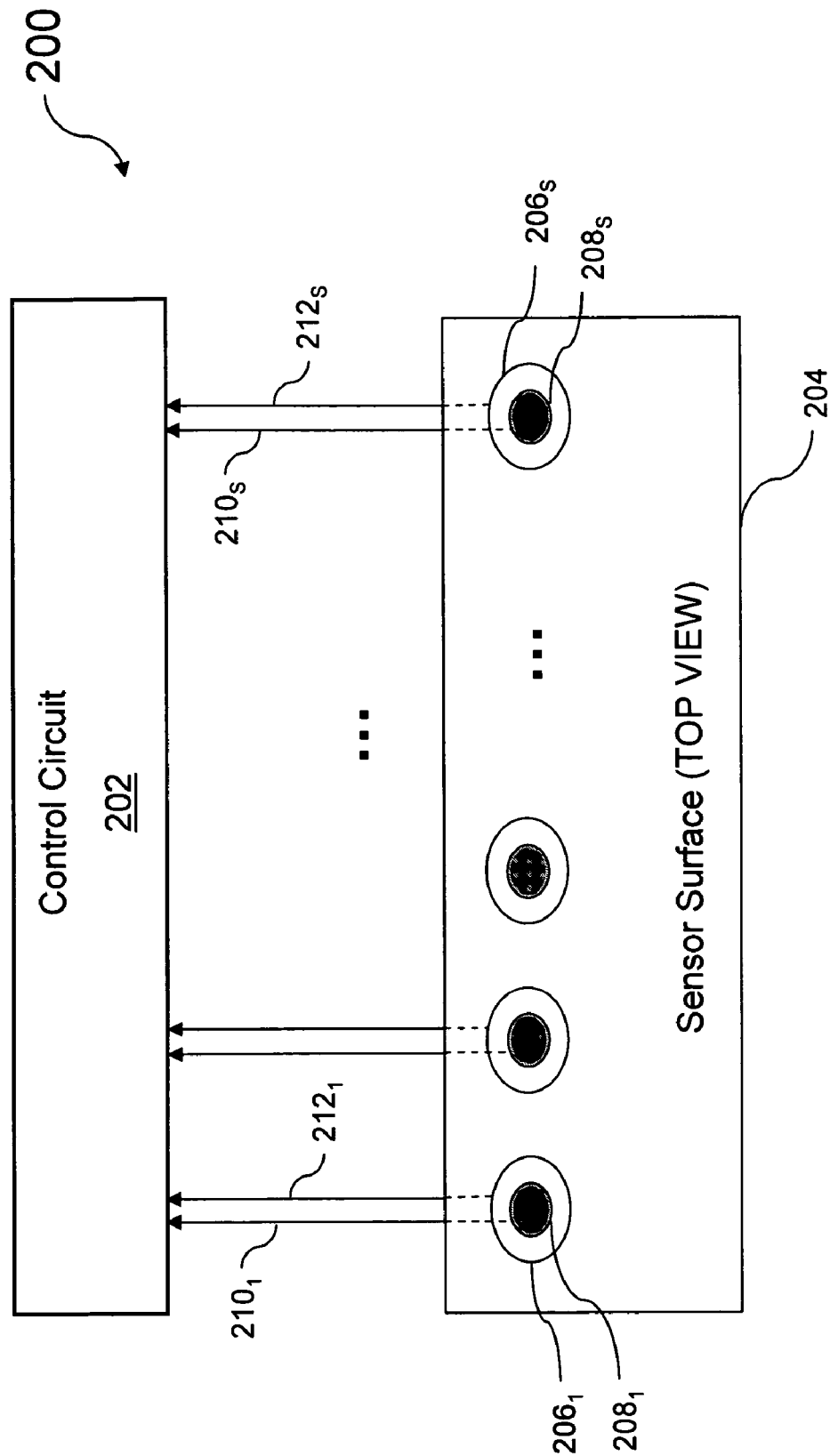
Figure 3:
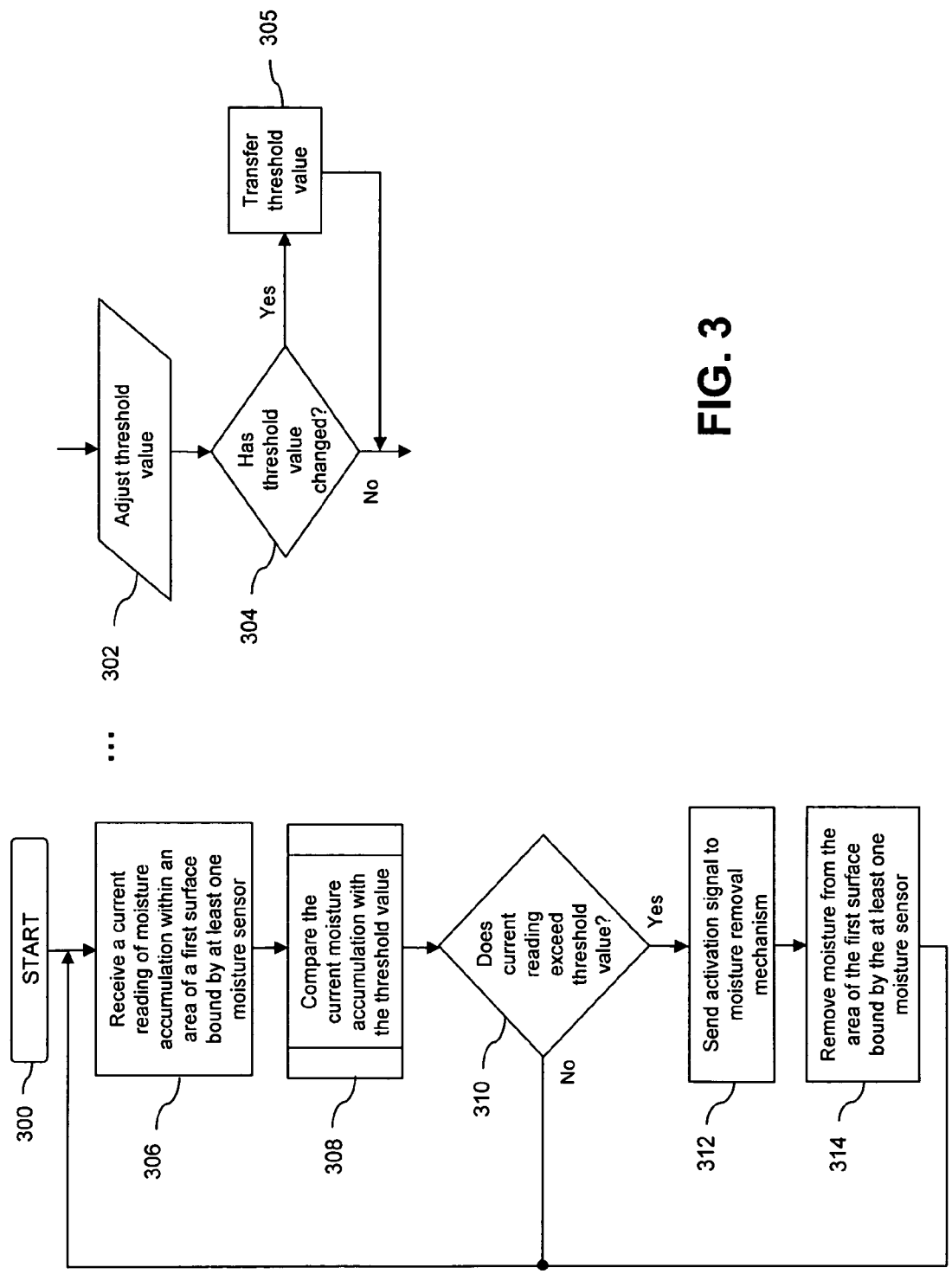

FIG. 1 is a block diagram of one embodiment of a moisture detection and removal system incorporating the use of a moisture removal activation module in accordance with the present invention;

FIG. 2 is a block diagram of one embodiment of a moisture detection and control subsystem incorporating the use of a moisture sensor integrated within a surface of a perforated plane in accordance with the present invention; and FIG. 3 is a flow diagram illustrating one embodiment of an implementation of a method for moisture detection to control a moisture removal operation in accordance with the present invention.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention address problems with moisture detection and removal and will be understood by reading and studying the following specification. Particularly, in one embodiment, a method for moisture detection and removal is provided. The method involves providing discrete feedback as an indication of current moisture accumulation on a surface of a perforated plane, wherein the plane includes at least one moisture sensor, integrated within the surface to form the plane, comparing the indication of current moisture accumulation with a threshold value, when the indication of current moisture accumulation exceeds the threshold value, sending an activation signal to a moisture removal mechanism, removing the current moisture accumulation from an area of the first surface bound by the at least one moisture sensor, and clearing the indication of current moisture accumulation to avoid any unnecessary operation of the moisture removal mechanism.

Embodiments of the present invention may be implemented with present automated moisture removal technologies as well as current moisture sensor monitoring technologies. This description is presented with enough detail to provide an understanding of the present invention, and should not be construed to encompass all necessary elements in an automated moisture removal system.

Although the examples of one or more of the embodiments in this specification are described in terms of automated moisture removal, embodiments of the present invention are not limited to applications of automated moisture removal. Embodiments of the present invention are applicable to any moisture detection and removal activity that requires the use of a moisture sensor for feedback in a control circuit. Alternate embodiments of the present invention to those described below utilize at least one moisture sensor integrated within the surface of a perforated plane that provides continuous, discrete feedback to a control circuit, and includes a user-defined threshold value used by the control circuit to instruct a moisture removal mechanism when to remove accumulated moisture from the surface of the perforated plane. In one embodiment, activating the moisture removal mechanism resets a threshold comparison value.

FIG. 1 is a block diagram of one embodiment of a moisture detection and removal system, indicated generally at 100, incorporating the use of a moisture removal activation module according to the teachings of the present invention. System 100 comprises a moisture threshold user interface 104, and a moisture removal activation module 102. Moisture removal activation module 102 includes a moisture sensor control processor 108, a moisture removal activation mechanism circuit 110, and a moisture sensor control circuit 114, each of which are discussed in turn below.

Moisture threshold user interface 104 is coupled to moisture removal activation module 102 by user communication interface 106. In one embodiment, user communication interface 106 is a bi-directional communication interface or the like that communicates between moisture threshold user interface 104 and moisture sensor control processor 108. In the same embodiment, moisture sensor control processor 108 is a microprocessor, a field programmable gate array (FPGA), or the like. Moisture sensor control processor 108 is also coupled to moisture removal activation mechanism circuit 110 by moisture removal activation interface 112. In one embodiment, moisture removal activation interface 112 is a bi-directional communications interface or the like that communicates between moisture removal activation mechanism circuit 110 and moisture sensor control processor 108. Moisture removal activation mechanism circuit 110 is responsible for activating a moisture removal mechanism (not shown). In one embodiment, the moisture removal mechanism is one of a group consisting of one or more windshield wipers, one or more rear window wipers, one or more flexible surface blades, a heating element, a blower element, or the like. Moisture removal activation mechanism circuit 110 is coupled to the moisture removal mechanism by moisture removal mechanism interface 118. In one embodiment, moisture removal mechanism interface 118 is an electrical interface or the like that activates the operation of the moisture removal mechanism.

Moisture sensor control processor 108 is also coupled to moisture sensor control circuit 114 by sensor control interface 116. In one embodiment, sensor control interface 116 is a bi-directional communications interface or the like that communicates between moisture sensor control circuit 114 and moisture sensor control processor 108. In the same embodiment, moisture sensor control circuit 114 is responsible for receiving feedback from a series of sensor connection pairs $120_1$ and $122_1$ to $120_N$ and $122_N$. The feedback received from the series of sensor connection pairs $120_1$ and $122_1$ to $120_N$ and $122_N$ comes in the form of discrete measurements, which are interpreted directly by moisture sensor control processor 108 as indicating moisture has been detected by at least one of sensor connection pairs $120_1$ and $122_1$ to $120_N$ and $122_N$. The discrete measurements that are used as feedback in moisture sensor control circuit 114 do not require additional data conversion, eliminating any unnecessary complexity.

In one embodiment, an operator adjusts a threshold value using moisture threshold user interface 104. In another embodiment, the threshold value is a predetermined value. The threshold value represents an acceptable amount of moisture present on a first surface bound by at least one moisture sensor (not shown) before the moisture removal mechanism is activated. In one embodiment, the threshold value is transferred to moisture sensor control processor 108 for storage and future comparison. As moisture accumulates on the surface, sensor connection pairs $120_1$ and $122_1$ to $120_N$ and $122_N$ provide an indication of current moisture accumulation on the surface to moisture sensor control circuit 114. In one embodiment, each of sensor connection pairs $120_1$ and $122_1$ to $120_N$ and $122_N$ form closed circuits when moisture is present that serve as feedback signals to moisture sensor control circuit 114. The forming of these closed circuits is disclosed in further detail with respect to FIG. 2 below.

In one embodiment, moisture sensor control circuit 114 communicates the number of individually closed circuits to moisture sensor control processor 108. Moisture sensor control processor 108 compares the number of individually closed circuits with the threshold value provided by moisture threshold user interface 104. When the number of individually closed circuits exceeds the threshold value, moisture sensor control processor 108 instructs moisture removal activation mechanism circuit 110 to activate the moisture removal mechanism. In one embodiment, every time the moisture removal mechanism is activated, all moisture is removed from an area of the first surface bound by the at least one moisture sensor. As soon as the moisture is removed, moisture sensor control circuit 114 no longer reports any closed circuits to moisture sensor control processor 108. With no closed circuits detected, moisture sensor control processor 108 will cease to send the moisture removal activation signal to wiper activation mechanism circuit 110. The moisture removal mechanism returns to a starting position to wait for a new moisture removal activation signal.

In another embodiment, every time the moisture removal mechanism is activated, a current accumulation of moisture is removed from an area of the first surface bound by the at least one moisture sensor. As soon as the moisture is removed, moisture sensor control circuit 114 continues to report a number of closed circuits to moisture sensor control processor 108 that exceeds the threshold value. The activation signal from moisture sensor control processor 108 is sent to moisture removal activation mechanism circuit 110, activating the moisture removal mechanism.

In yet another embodiment, the moisture removal mechanism is activated and the current accumulation of moisture is removed from an area of the first surface bound by the at least one moisture sensor. As soon as the moisture is removed, moisture sensor control circuit 114 reports the number of closed circuits to moisture sensor control processor 108 that does not exceed the threshold value. The activation signal from moisture sensor control processor 108 is no longer sent to moisture removal activation mechanism circuit 110. The moisture removal mechanism returns to a starting position to wait for a new moisture removal activation signal. Since the detection process restarts with every movement of the moisture removal mechanism across the surface bound by the moisture sensor, a dynamic method of moisture detection is achieved. Moisture detection system 100 is able to quickly adapt to changing conditions, and avoid unnecessary operation of the moisture removal mechanism.

FIG. 2 is a block diagram of one embodiment of a moisture detection and control subsystem, indicated generally at 200, incorporating the use of a moisture sensor integrated within a surface of a perforated plane according to the teachings of the present invention. Subsystem 200 comprises control circuit 202, sensor surface 204, and a series of sensor conductor pairs $206_1$ and $208_1$ to $206_S$ and $208_S$ corresponding to sensor conductor connection pairs $210_1$ and $212_1$ to $210_S$ and $212_S$. It is noted that for simplicity in description, four sets of sensor conductor pairs $206_1$ and $208_1$ to $206_S$ and $208_S$ are shown in FIG. 2. However, it is understood that sensor surface 204 supports any appropriate number of sensor conductor pairs $206_1$ and $208_1$ to $206_S$ and $208_S$, e.g., one or more sensor conductor pairs, in a single moisture detection and control subsystem 200. In one embodiment, sensor conductor pairs $206_1$ and $208_1$ to $206_S$ and $208_S$ are isolated electrical conductors integrated within sensor surface 204, forming a perforated plane. The perforated plane of sensor surface 204 allows each sensor conductor pair $206_1$ and $208_1$ to $206_S$ and $208_S$ to be exposed as concentric rings on sensor surface 204. Sensor conductor pairs $206_1$ and $208_1$ to $206_S$ and $208_S$ are electrically coupled to control circuit 202 by sensor conductor connection pairs $210_1$ and $212_1$ to $210_S$ and $212_S$.

In operation, as moisture collects on sensor surface 204, any moisture that lands on the concentric rings of sensor conductor pairs $206_1$ and $208_1$ to $206_S$ and $208_S$ create an electrical connection between any of sensor conductor pairs $206_1$ and $208_1$ to $206_S$ and $208_S$. As soon as the electrical connection is made between any of sensor conductor pairs $206_1$ and $208_1$ to $206_S$ and $208_S$, control circuit 202 is informed of a presence of moisture on sensor surface 204 by a sensor conductor connection, e.g., moisture closes the circuit between $206_1$ and $208_1$ effectively shorting sensor conductor connections $210_1$ and $212_1$ together. As more sensor conductor connection pairs $210_1$ and $212_1$ to $210_S$ and $212_S$ are shorted together, a larger feedback value is provided by control circuit 202. The larger feedback value signifies an increase in the amount of moisture present on sensor surface 204. When the moisture is removed from any particular pair of sensor conductor connections $210_1$ and $212_1$ to $210_S$ and $212_S$, that particular pair is no longer shorted together. The loss of closed circuits signifies a decrease in the amount of moisture present on sensor surface 204 and control circuit 202 provides a smaller feedback signal. This type of immediate feedback provided by control circuit 202 allows moisture detection and control subsystem 200 to be adapted into many applications, including a moisture removal operation described with respect to FIG. 3 below.

FIG. 3 is a flow diagram illustrating an embodiment of a method according to the teachings of the present invention for moisture detection to control a moisture removal operation. The method of FIG. 3 begins at block 300. In one embodiment, once a threshold value is established (or adjusted) at block 302, the method of FIG. 3 begins the process of determining whether sufficient moisture has accumulated to justify the moisture removal. In an alternate embodiment, the threshold value is fixed at a predetermined value and stored in a control medium. The method of FIG. 3 is designed to provide discrete feedback of moisture detection without the need for additional data conversion in an automated moisture removal mechanism. In one embodiment, the moisture removal mechanism is one of a group consisting of one or more windshield wipers, one or more rear window wipers, one or more flexible surface blades, a heating element, a blower element, or the like.

At block 304, the method determines whether the adjusted threshold value has changed from a previous or default value. In one embodiment, this determination is made in the control medium. When the adjusted threshold value has changed, the method proceeds to block 305. At block 305, the method begins transferring the threshold value to the control medium, and proceeds to block 306. When the adjusted threshold value has not changed, or the threshold value was fixed at the predetermined value, the method continues at block 306. In both embodiments, the control medium is a control processor such as a field programmable gate array (FPGA), a microprocessor, or the like.

At block 306, the method receives a current reading of moisture accumulation within an area of a first surface bound by at least one moisture sensor. In one embodiment, the at least one moisture sensor is integrated with the first surface to form a perforated plane. Moreover, the current moisture accumulation is detected by a control circuit connected to the at least one moisture sensor and providing feedback to the control processor. The feedback provided by the control circuit indicates a number of closed circuits. Each closed circuit indicates that moisture was detected within the area of the first surface bound by the at least one moisture sensor. Once the current moisture accumulation is known (indicated by the number of closed circuits), the method proceeds to block 308.

At block 308, the current moisture accumulation is compared with the threshold value. In one embodiment, a comparison value is stored in the control medium. Once the comparison is made, the method proceeds to block 310. At block 310, the method determines whether the current moisture accumulation reading exceeds the threshold value. When the current reading does not exceed the threshold value, the method proceeds back to block 304 to repeat another sequence. When the current reading exceeds the threshold value, the method proceeds to block 312.

At block 312, an activation signal is sent to clear the moisture accumulation from within the area of the first surface bound by the at least one moisture sensor. The activation signal activates the moisture removal mechanism. Once the activation signal is sent, the method proceeds to block 314. At block 314, the area of the first surface bound by the at least one moisture sensor is cleared of some of the current moisture accumulation by the moisture removal mechanism. In one embodiment, activating the moisture removal mechanism automatically resets the current indication of moisture accumulation within the area of the first surface bound by the at least one moisture sensor. The method proceeds back to block 304 to repeat another sequence.

In view of the foregoing, it will be understood by those skilled in the art that the methods of the present invention can be implemented in combination with present moisture detection and removal technology. Variations and modifications may occur, which fall within the scope of the present invention, as set forth in the following claims.

What is claimed is:

1. A method for moisture detection and removal, the method comprising:
providing discrete feedback as an indication of current moisture accumulation on a surface of a perforated plane, wherein the plane includes at least one moisture sensor, integrated within the surface to form the plane, wherein the at least one moisture sensor comprises a set of concentric rings exposed as a pair of isolated electrical conductors and the discrete feedback indicates a number of closed circuits provided by the at least one moisture sensor, each closed circuit signifying moisture was detected within the area of the surface bound by the at least one moisture sensor;

comparing the indication of current moisture accumulation with a threshold value;

when the indication of current moisture accumulation exceeds the threshold value, sending an activation signal to a moisture removal mechanism;

removing the current moisture accumulation from an area of the first surface bound by the at least one moisture sensor; and clearing the indication of current moisture accumulation to avoid any unnecessary operation of the moisture removal mechanism.

2. The method of claim 1, wherein the moisture removal mechanism is one of a group consisting of one or more windshield wipers, one or more rear window wipers, one or more flexible surface blades, a heating element, and a blower element.

3. The method of claim 1, wherein the threshold value is a predetermined value.

4. The method of claim 1, wherein the threshold value is an adjustable value provided as an input from a user interface.

5. The method of claim 1, wherein the discrete feedback is provided to a control circuit connected to a control medium.

6. The method of claim 5, wherein the control circuit further comprises indicating a number of closed circuits on the surface, each closed circuit indicating moisture was detected within the area of the first surface bound by the at least one moisture sensor.

7. The method of claim 5, wherein the control medium is a control processor comprising one of a field programmable gate array and a microprocessor.

8. The method of claim 5, wherein the control medium further comprises storing a comparison value for comparing the indication of current moisture accumulation with the threshold value.

9. The method of claim 8, wherein the comparison value is reset each time the current moisture accumulation is removed.

10. A moisture sensor, comprising:
a plane having a first surface;
at least one series of sensor conductor pairs coupled to the first surface providing discrete feedback to a control circuit when moisture is detected on the first surface, wherein each of the at least one series of sensor conductor pairs are isolated electrical conductors comprising a set of concentric rings;
wherein each of the at least one series of sensor conductor pairs form a closed circuit when moisture is detected by at least one sensor conductor pair; and
wherein the discrete feedback indicates a number of the closed circuits signifying moisture was detected within the area of the first surface bound by the moisture sensor.

11. The sensor of claim 10, wherein the isolated electrical conductors are integrated within the first surface to form a perforated plane.

12. A moisture detection and removal system, comprising:
a moisture threshold user interface; and
a moisture removal activation module, the module comprising:
a moisture sensor control circuit connected to at least one moisture sensor integrated with a first surface to form a perforated plane, wherein the at least one moisture sensor comprises a set of concentric rings exposed as a pair of isolated electrical conductors and the moisture sensor control circuit further comprises a feedback mechanism connected to the at least one moisture sensor, the feedback mechanism operable to indicate a number of closed circuits provided by the at least one moisture sensor, each closed circuit signifying moisture was detected within the area of the first surface bound by the at least one moisture sensor;
a moisture removal activation mechanism circuit; and
a moisture sensor control processor coupled to the moisture sensor control circuit and the moisture removal activation mechanism circuit, wherein the moisture sensor control processor responds to a clearing of accumulated moisture from an area of the first surface bound by the at least one moisture sensor by a moisture removal mechanism.

13. The system of claim 12, wherein the moisture removal mechanism includes one or more of one or more windshield wipers, one or more rear window wipers, one or more flexible surface blades, a heating element, and a blower element.

14. The system of claim 12, wherein the moisture threshold user interface allows an operator to provide an adjustable moisture threshold value to the moisture sensor control processor for comparison with the amount of moisture detected by the at least one moisture sensor.

15. The system of claim 14, wherein the adjustable moisture threshold value is a predetermined value provided to the moisture sensor control processor for comparison with the amount of moisture detected by the at least one moisture sensor.

16. The system of claim 12, wherein the moisture sensor activation mechanism circuit further comprises receiving an activation signal as a result of the moisture sensor control circuit indicating an amount of moisture is present on the first surface bound by the at least one moisture sensor that exceeds an acceptable moisture threshold.

17. The system of claim 12, wherein an activation of the moisture removal mechanism automatically resets a current indication of moisture accumulation within the area of the first surface bound by the at least one moisture sensor.

* * * * *